United States Patent [19]
Schilling et al.

[11] Patent Number: 6,004,101
[45] Date of Patent: Dec. 21, 1999

[54] REINFORCED ALUMINUM FAN BLADE

[75] Inventors: Jan C. Schilling, Middletown; Joseph J. Jackson, Cincinnati; Bruce C. Busbey, Loveland, all of Ohio

[73] Assignee: General Electric Company, Cincinnati, Ohio

[21] Appl. No.: 09/134,827

[22] Filed: Aug. 17, 1998

[51] Int. Cl.$^6$ ....................................................... B63H 1/26
[52] U.S. Cl. ................. 416/224; 416/219 R; 416/229 A; 416/248; 416/220 R; 416/239
[58] Field of Search ................................. 416/219 R, 224, 416/229 A, 248, 220 R, 239

Primary Examiner—Edward K. Look
Assistant Examiner—Ninh Nguyen
Attorney, Agent, or Firm—Andrew C. Hess; Nathan D. Herkamp

[57] ABSTRACT

A gas turbine engine fan blade includes an airfoil and dovetail having an integral aluminum core and a fatigue resistant reinforcing sheath.

17 Claims, 2 Drawing Sheets

REINFORCED ALUMINUM FAN BLADE

BACKGROUND OF THE INVENTION

The present invention relates generally to gas turbine engines, and, more specifically, to fan blades therein.

The high bypass turbofan gas turbine engine is commonly used for powering aircraft in flight. The fan includes a row of fan blades mounted to the perimeter of a rotor disk and powered by a corresponding turbine which extracts energy from combustion gases generated in a core engine. The core engine typically includes an axi-symmetrical multi-stage centrifugal compressor which provides pressured air to a combustor wherein it is mixed with fuel and ignited for generating hot combustion gases which flow downstream through a high pressure turbine which powers the compressor, followed in turn by a low pressure turbine which powers the fan.

Engine propulsion thrust is typically increased by increasing diameter of the fan blades, which also necessarily increases their weight and stress during operation. Accordingly, larger fan blades require correspondingly high strength materials in order to accommodate the various aerodynamic and centrifugal stresses generated during operation for obtaining a suitable useful life.

A typical fan blade includes an airfoil and an integral dovetail at the root thereof which permits individual assembly and disassembly of the blades in corresponding dovetail slots in the fan rotor disk. The blade dovetail must therefore have sufficient strength for transferring the significant centrifugal loads from the rotating fan blades into the perimeter of the rotor disk within acceptable stress limits. The size and configuration of the airfoil is determined by the specific aerodynamic requirements of the fan and is limited by the availability of suitable high strength materials capable of withstanding the various stresses experienced during operation.

For example, titanium is a common high strength material used in fan blades, but is undesirably expensive. A solid titanium fan blade is most readily manufactured, yet has a correspondingly high weight which adds to the centrifugal loads generated during operation.

Hollow titanium fan blades are also known for reducing weight while maintaining strength, but correspondingly increase the complexity of blade manufacture and associated costs.

Another form of the titanium fan blade is the hybrid fan blade which is primarily solid titanium with weight reducing pockets formed therein which may be filled with a lightweight, nonstructural filler material to complete the aerodynamic profile of the blade.

The hollow titanium blade has minimum weight with suitable high strength yet is very expensive to manufacture. The hybrid titanium blade is less expensive to manufacture yet does not enjoy the greater weight reductions of the hollow titanium blade.

Accordingly, it is desired to provide an improved high strength, low weight fan blade at reduced cost.

BRIEF SUMMARY OF THE INVENTION

A gas turbine engine fan blade includes an airfoil and dovetail having an integral aluminum core and a fatigue resistant reinforcing sheath.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
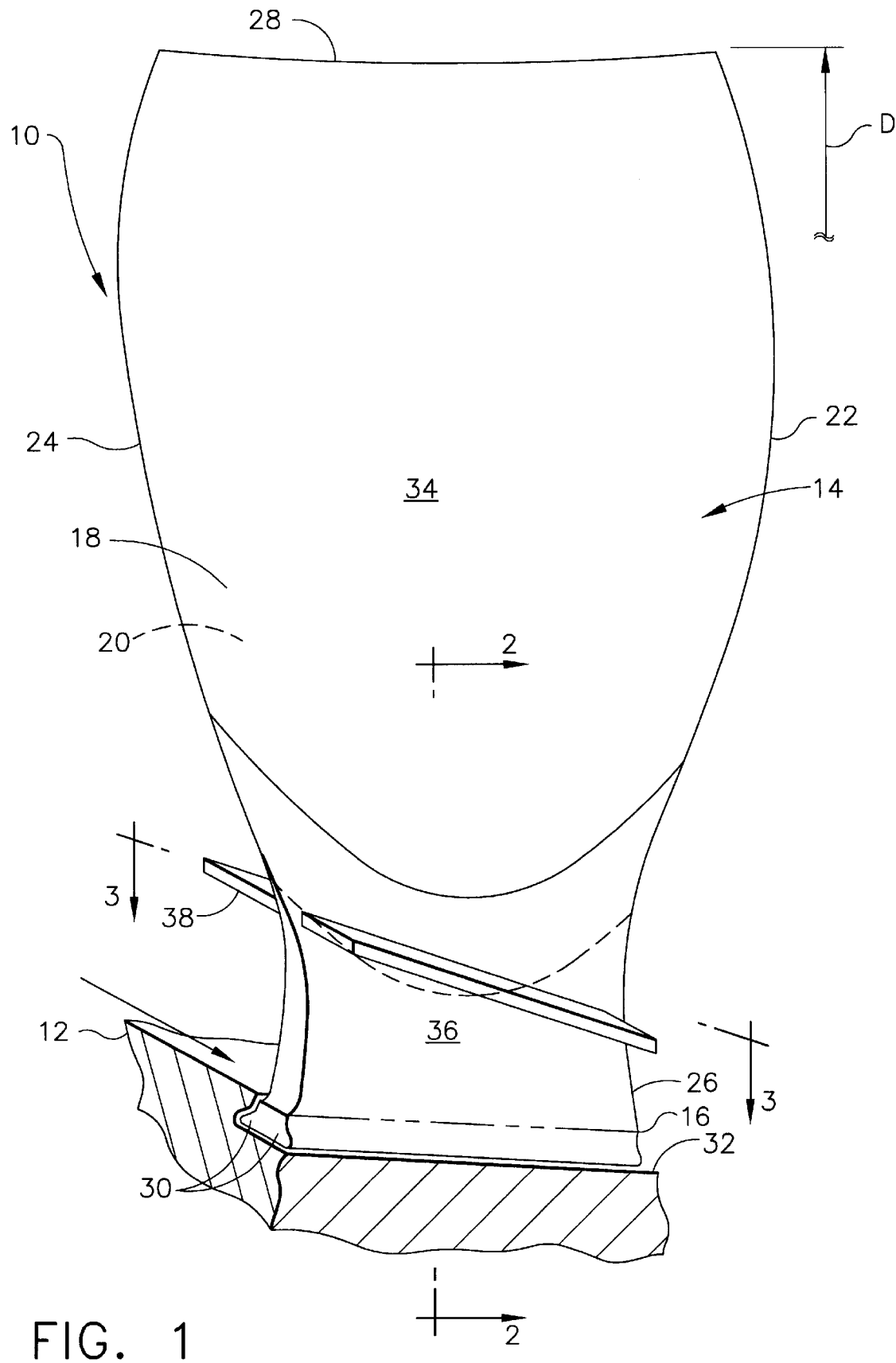
FIG. 1 is an elevational view of a gas turbine engine fan blade joined to a rotor disk in accordance with an exemplary embodiment of the present invention.

Illustrated in FIG. 1 is one of several fan blades 10 in accordance with an exemplary embodiment of the present invention mounted to the perimeter of fan rotor disk 12 of a turbofan gas turbine engine for powering an aircraft in flight. Each blade 10 includes an airfoil 14 and integral mounting dovetail 16.

The airfoil includes a generally concave, first or pressure side 18, and an opposite generally convex, second or suction side 20. The direction of rotation of the disk 12 and attached blade 10 is illustrated by the arrow in FIG. 1 with the pressure side preceding the suction side as the disk rotates.

The airfoil 14 includes a leading edge 22 at the front side thereof, and an opposite trailing edge 24 at an aft side thereof, and extends from a root or shank 26 joining the dovetail 16 radially outwardly to a radially outer tip 28. The blade 10 has a radial length which is sized in conjunction with the rotor disk 12 for effecting a tip-to-tip diameter D.

The dovetail 16 includes a pair of circumferentially opposite lobes or tangs 30 configured for mounting the blade to the rotor disk in corresponding dovetail slots 32.

In accordance with the present invention, the airfoil and dovetail have an integral, one-piece core 34 which is preferably made of lightweight aluminum. The core may be formed of relatively high strength aircraft quality aluminum alloy such as that designated "7075" which is commercially available from Alcoa, Lafayette, Ind. The aluminum core is readily formed in the configuration required for the airfoil and dovetail for reducing the cost of manufacturing the blade.

However, aluminum alone has insufficient strength for use in a high bypass turbofan application for powering an aircraft in flight. In particular, aluminum lacks sufficient high and low cycle fatigue strengths in the high stress region at the airfoil root 26 where it adjoins the dovetail 16 through which the entire centrifugal loads of the blade must be carried into the rotor disk 12.

Accordingly, a fatigue resistant reinforcing cover or sheath 36 in accordance with the present invention extends between the airfoil and dovetail and is fixedly bonded thereto for increasing blade strength in this region of high centrifugal loading.

In a preferred embodiment, the sheath 36 is formed of high strength titanium and is diffusion bonded to the aluminum core 34. By forming the major portion of the blade 10 using the aluminum core 34, a significant weight reduction may be obtained. And, by providing the high strength titanium sheath 36 at the airfoil root and dovetail, the strength of the blade in this region may be selectively increased for withstanding the substantial loads and fatigue cycles during operation. In this way, both a high strength and low weight fan blade may be obtained which allows the preferential use of titanium without the conventional high cost associated therewith.

A significant advantage of the aluminum-titanium fan blade is the enhanced cooperation of these materials. Diffusion bonding is a well known process, and has particular utility in bonding the titanium sheath 36 to the aluminum core 34 in a high strength bond therebetween. Titanium to aluminum diffusion bonding is substantially easier to effect than titanium to titanium diffusion bonding.

Figure 2:
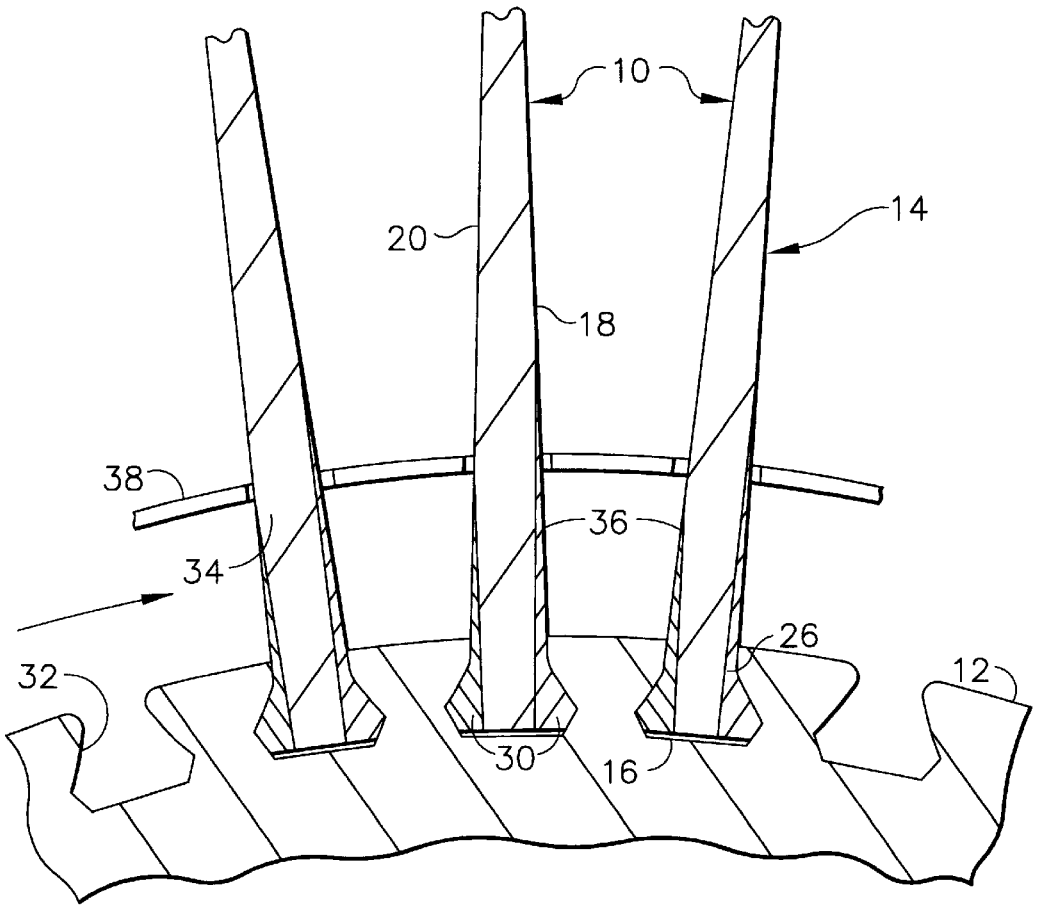
FIG. 2 is a radial sectional view through adjacent fan blades mounted in the disk of FIG. 1 and taken along line 2—2.

The amount of the titanium sheath 36 used in the blade is preferably limited to the high-load airfoil root region for minimizing its use. As shown in FIG. 2, the sheath 36 includes both tangs 30 and the root 26 for increasing high and low cycle fatigue strengths of the blade mounted in the disk. The titanium sheath 36 has relatively high tensile strength, high cycle fatigue resistance, and impact strength, and is selectively used in the blade at the surface thereof in the transition from the airfoil to the dovetail for being mounted to the disk 12.

As shown in FIGS. 1 and 2, the sheath 36 extends from the dovetail 16 toward the airfoil tip 28 in part over at least the pressure side 18, and preferably over both the pressure and suction sides, with a greater span extent on the pressure side 18 than over the suction side 20. The sheath 36 defines at least both tangs 30 for providing a high strength reaction surface for transferring the centrifugal loads into the rotor disk 12. The sheath 36 extends upwardly from the dovetail along the airfoil pressure side 18 for reacting the tension loads developed therein during operation.

In a blade-out condition when a portion of one of the blades 10 is damaged, due to foreign object damage for example, the pressure side 18 of the next adjacent fan blade is in line for secondary damage therefrom. By extending the pressure side portion of the sheath 36 to a suitable radius or airfoil span, such as up to about 35%, the sheath provides additional protection against subsequent impact damage thereto. Since the suction sides 20 are hidden behind the pressure sides, the portion of the sheath 36 thereon need not extend radially outwardly as much as the pressure side sheath for further reducing the cost of the blade.

As shown in FIG. 1, the sheath 36 extends toward the airfoil tip 28 preferably with a greater radial extent along both the leading and trailing edges 22, 24 than therebetween. The sheath 36 therefore has a generally U-shaped termination in the airfoil 14 and is radially shorter inboard or mid-chord between the opposite and leading and trailing edges 22, 24. In this way, the strength reinforcing characteristic of the sheath 36 is best utilized not only near the airfoil root but also along the high stress leading and trailing edges therewith.

Figure 3:
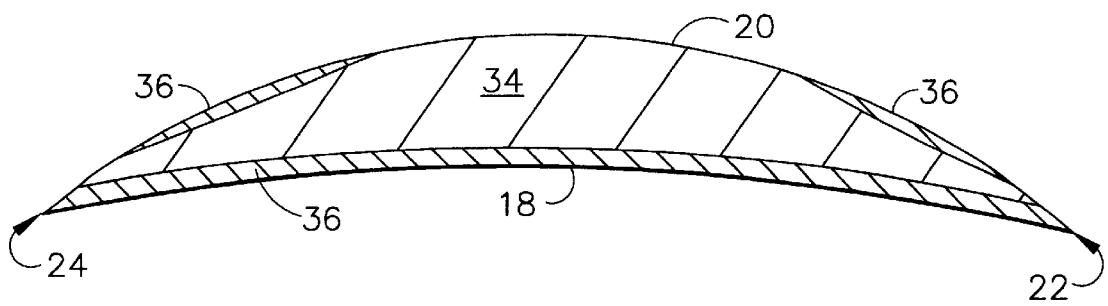
FIG. 3 is top sectional view through a portion of the fan blade illustrated in FIG. 1 and taken along line 3—3.

As shown in FIG. 3, the core 34 is preferably solid aluminum, and the titanium sheath 36 is also preferably solid in plate form diffusion bonded to the surface of the core. For example, the sheath 36 may be forged, or machined to shape from a plate.

In the preferred embodiment, the sheath includes two distinct portions which are diffusion bonded only to the straight center core 34 on opposite sides thereof. The pressure and suction side sheath portions do not join each other along the leading and trailing edges to avoid the need to effect titanium-to-titanium diffusion bonding around the aluminum core since the temperature required therefor would exceed the melting temperature of the core.

The core 34 and sheath 36 are therefore preferably monolithic in the preferred embodiment for maximizing strength while reducing weight, and at reduced manufacturing cost.

Furthermore, since the majority of the blade is formed of aluminum, it is also readily repairable in view of the ductility of aluminum as compared to non-ductile titanium found in conventional blades.

The fan blade 10 preferably also includes separate platforms 38 which define the radially inner flowpath boundary of the airflow thereover. The platforms 38 bridge adjacent fan blades and are typically inclined above the respective dovetails 16. The sheaths 36 may be hidden below the platforms 38, or may be exposed in part radially outwardly therefrom as desired.

The airfoil 14 illustrated in FIG. 1 may have various configurations for use in various turbofan gas turbine engines. For example, it may have a relatively wide chord for use in a high bypass turbofan engine. The airfoil 14 may be sized in length for effecting a diameter D at the airfoil tip 28 at least as large as about 1.9 meters. In this large diameter fan configuration, blade tip speeds greater than about 425 meters per second may be obtained. In this large size and substantial tip speed application, the solid aluminum core 34 with titanium sheath 36 may be used for obtaining strength comparable to a conventional hollow titanium or titanium hybrid fan blade.

More importantly, however, the improved fan blade 10 has a significant reduction in cost of manufacture over conventional hollow titanium fan blades, yet provides a significant weight improvement over the conventional titanium hybrid fan blades.

The titanium sheathed fan blade 10 allows increased tip speed thereof as compared to a solid aluminum fan blade without the sheath reinforcement. And, the sheath reinforcement of the aluminum core 34 substantially improves root strength of the blade.

The cost of producing the fan blade 10 should be about the same as producing the conventional titanium hybrid blade, which is substantially less than the hollow titanium blade or related composite blades, while having the weight and tip speed equivalency to the hollow titanium fan blade.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A gas turbine engine fan blade comprising:
   an airfoil and dovetail having an integral one-piece aluminum core; and
   a reinforcing sheath extending between said airfoil and dovetail and bonded thereto.

2. A blade according to claim 1 wherein:
   said dovetail includes a pair of tangs for mounting said blade to a rotor disk;
   said airfoil includes a root at said dovetail; and
   said sheath includes both said tangs and root for increasing fatigue strength of said blade mounted in said disk.

3. A blade according to claim 2 wherein said airfoil includes opposite pressure and suction sides and a tip, and said sheath extends from said dovetail toward said tip in part over at least said pressure side.

4. A blade according to claim 3 wherein said sheath also extends from said dovetail along said suction side, with a greater extent on said pressure side than over said suction side.

5. A blade according to claim 4 wherein said airfoil includes opposite leading and trailing edges and said sheath extends toward said tip with greater extent along said leading and trailing edges than therebetween.

6. A blade according to claim 3 wherein said sheath comprises titanium.

7. A blade according to claim 6 wherein said titanium sheath includes two distinct portions diffusion bonded only to said aluminum core on opposite sides thereof, and not to each other.

8. A blade according to claim 7 wherein said airfoil is sized in length for effecting a fan diameter at said tip at least as large as about 1.9 meters.

9. A blade according to claim 8 wherein said core is solid.

10. A blade according to claim 9 wherein said core and sheath are monolithic.

11. A gas turbine engine fan blade comprising:

an airfoil and a dovetail having an integral aluminum core;

said airfoil including opposite pressure and suction sides, a root at said dovetail, and an opposite tip;

a reinforcing sheath bonded to said core along both said pressure and suction sides from said dovetail toward said tip, with a greater extent on said pressure side than said suction side, and including a pair of tangs defining said dovetail for mounting said blade to a rotor disk.

12. A gas turbine engine fan blade comprising:

an airfoil and a dovetail having an integral aluminum core;

said airfoil including opposite pressure and suction sides, opposite leading and trailing edges, a root at said dovetail, and an opposite tip;

a reinforcing sheath bonded to said core along both said pressure and suction sides from said dovetail toward said tip, with a greater extent along said leading and trailing edges than therebetween, and including a pair of tangs defining said dovetail for mounting said blade to a rotor disk.

13. A gas turbine engine fan blade comprising a monolithic aluminum core defining an airfoil, and a reinforcing sheath diffusion bonded at one end of said core for defining a dovetail.

14. A blade according to claim 13 wherein said dovetail sheath includes a pair of tangs bonded to corresponding opposite sides of said core.

15. A blade according to claim 14 wherein said airfoil includes opposite pressure and suction sides, and said sheath extends in part therealong.

16. A blade according to claim 15 wherein said airfoil further includes opposite leading and trailing edges, and said sheath extends in part therealong.

17. A blade according to claim 16 wherein said sheath further comprises one portion on one side of said airfoil including both said leading and trailing edges, and another portion on an opposite side of said airfoil spaced from said leading and trailing edges.

* * * * *